United States Patent
Kwon et al.

(10) Patent No.: US 9,954,981 B2
(45) Date of Patent: Apr. 24, 2018

(54) METHOD AND APPARATUS FOR PROCESSING SIGNALING DATA BETWEEN LAYERS IN IP-BASED DIGITAL BROADCASTING SYSTEM

(71) Applicant: LG ELECTRONICS INC., Seoul (KR)

(72) Inventors: Woosuk Kwon, Seoul (KR); Kyoungsoo Moon, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 14/890,819

(22) PCT Filed: May 21, 2014

(86) PCT No.: PCT/KR2014/004529
§ 371 (c)(1),
(2) Date: Nov. 12, 2015

(87) PCT Pub. No.: WO2014/189278
PCT Pub. Date: Nov. 27, 2014

(65) Prior Publication Data
US 2016/0094687 A1 Mar. 31, 2016

Related U.S. Application Data

(60) Provisional application No. 61/826,462, filed on May 22, 2013.

(51) Int. Cl.
*H04N 21/23* (2011.01)
*H04N 21/63* (2011.01)
(Continued)

(52) U.S. Cl.
CPC .............. *H04L 69/22* (2013.01); *H04L 12/18* (2013.01); *H04L 61/2007* (2013.01);
(Continued)

(58) Field of Classification Search
CPC ......... H04L 69/22; H04L 12/18; H04L 69/16; H04L 47/01; H04L 63/01
See application file for complete search history.

(56) References Cited

U.S. PATENT DOCUMENTS

| 7,523,179 B1 * | 4/2009 | Chu ...................... G06F 15/173 |
| | | 370/395.72 |
| 7,940,650 B1 * | 5/2011 | Sandhir ................... H04L 45/28 |
| | | 340/2.23 |

(Continued)

FOREIGN PATENT DOCUMENTS

| EP | 2362650 A1 | 8/2011 |
| EP | 2571258 A2 | 3/2013 |

(Continued)

OTHER PUBLICATIONS

Jani, et al.: "Signaling Solution for the NGH IP profile", XP017834309, Digital Video Broadcasting, Apr. 10, 2011.

(Continued)

*Primary Examiner* — Xavier Szewai Wong
(74) *Attorney, Agent, or Firm* — Dentons US LLP

(57) ABSTRACT

A method for processing signaling data included in at least one protocol layer in an internet protocol (IP)-based digital broadcast transmitter, according to an embodiment of the present invention, comprises the steps of: copying signaling data included in a packet of a layer (N+M) according to a protocol of the layer (N+M); inserting the copied signaling data, a length field for identifying the length of the copied signaling data, and a signaling indicator indicative of the existence of the copied signaling data into the end of a (Continued)

payload of the packet of the layer (N+M), thereby generating the packet of the layer (N+M); generating a packet of a layer (N+L) including a header of the layer (N+L) and the packet of the layer (N+M) according to a protocol of the layer (N+L); generating a packet of a layer (N) including a header of the layer (N) and the packet of the layer (N+L) according to a protocol of the layer (N), wherein the header of the layer (N) includes an indicator field for identifying that the signaling indicator is included in the packet of the layer (N); and processing the packet of the layer (N) according to a protocol of a physical layer, thereby generating a broadcast signal.

6 Claims, 12 Drawing Sheets

(51) Int. Cl.
| | | |
|---|---|---|
| H04N 21/64 | (2011.01) | |
| H04L 12/18 | (2006.01) | |
| H04L 29/06 | (2006.01) | |
| H04N 21/2381 | (2011.01) | |
| H04N 21/6332 | (2011.01) | |
| H04N 21/643 | (2011.01) | |
| H04L 29/12 | (2006.01) | |

(52) U.S. Cl.
CPC .......... *H04L 65/607* (2013.01); *H04L 69/161* (2013.01); *H04N 21/2381* (2013.01); *H04N 21/6332* (2013.01); *H04N 21/64322* (2013.01)

(56) References Cited

U.S. PATENT DOCUMENTS

| | | | | |
|---|---|---|---|---|
| 2004/0177106 | A1* | 9/2004 | Rose | H04L 63/0236 709/200 |
| 2005/0175007 | A1* | 8/2005 | Park | H04L 29/12264 370/390 |
| 2006/0268841 | A1* | 11/2006 | Nagaraj | H04L 1/0083 370/352 |
| 2007/0183761 | A1* | 8/2007 | Kobayashi | G03B 17/00 396/52 |
| 2007/0298781 | A1* | 12/2007 | Jiang | H04W 36/02 455/423 |
| 2008/0285945 | A1* | 11/2008 | Rajakarunanayake | H04N 21/4325 386/235 |
| 2010/0263014 | A1 | 10/2010 | Ha | |
| 2013/0034032 | A1 | 2/2013 | Vaere et al. | |

FOREIGN PATENT DOCUMENTS

| | | |
|---|---|---|
| JP | 2011-523806 A | 8/2011 |
| KR | 10-2012-0018201 A | 2/2012 |
| KR | 10-2012-0067529 A | 6/2012 |
| KR | 10-2012-0123638 A | 11/2012 |
| KR | 10-2012-0139520 A | 12/2012 |
| WO | 2012/173387 A2 | 12/2012 |

OTHER PUBLICATIONS

Mourad: "ROHC-U+ for IP header compression", XP017834185, Digital Video Broadcasting, London, GB, Aug. 22, 2011.
Hong: "RoHC signaling", XP017834556, Digital Video Broadcasting, Apr. 10, 2011.
Hong: "Consideration for RoHC transmission", XP017834282, Digital Video Broadcasting, Feb. 15, 2011.
Search Report of European Patent Office in Appl'n No. 14801376.6, dated Sep. 15, 2016.

* cited by examiner (A) OPERATION FLOW OF TRANSMITTER (B) OPERATION FLOW OF RECEIVER

METHOD AND APPARATUS FOR PROCESSING SIGNALING DATA BETWEEN LAYERS IN IP-BASED DIGITAL BROADCASTING SYSTEM This application is a U.S. National Phase Application under 35 U.S.C. § 371 of International Application PCT/KR2014/004529 filed on May 21, 2014, which claims the benefit of U.S. Provisional Application No. 61/826,462 filed on May 22, 2013, the entire content of the prior applications is hereby incorporated by reference.

TECHNICAL FIELD

The present invention relates to a method and an apparatus for processing broadcast signal signaling data in a digital broadcast system. More specifically, the present invention relates to a method and an apparatus for processing broadcast signaling data in protocol layers defined in an Internet protocol (IP)-based digital broadcast system.

BACKGROUND ART

Transmission and reception of a broadcast signal based on IP has been extended in a digital broadcast system. In particular, significance of an IP-based broadcast signal transmission/reception environment has been emphasized in mobile digital broadcasting such as digital video broadcasting (DVB)-next generation handheld (NGH), a European broadcast standard, or advanced television systems committee (ATSC)-mobile handheld (MH), a North American broadcast standard. In addition, a hybrid broadcast system serviced through a linkage between a broadcast network and an Internet network is expected to be constructed in a next generation broadcast system.

IP which is mainly used in the Internet network has been developed for transmission of general-purpose data rather than broadcasting. Thus, a technology needs to be additionally developed to use IP in a broadcast system.

In general, a network configuration is expressed by protocol layers. For example, the network configuration may have a hierarchical structure based on an open systems interconnection (OSI) reference model. The OSI reference model includes seven layers. However, in a digital broadcast system based on IP, layer 5 and up may have an integrated function or have indistinguishable functions. For example, in the IP-based digital broadcast system, layers lower than or equal to layer 4 may transmit broadcast data. Therefore, even though a method and an apparatus for processing signaling data described in the present application may correspond to a layer defined in seven OSI layers, the method and the apparatus are applicable to a network configuration of N layers newly defined in the IP-based digital broadcast system.

Meanwhile, in the broadcast system, signaling data is included in a broadcast signal and transmitted such that a viewer easily acquires a desired broadcast service, broadcast program, broadcast channel, broadcast event, etc. from a receiver. The signaling data (or signaling information) includes a series of information necessary for the receiver to rapidly access a transmission parameter, broadcast system information, program specific information (PSI), a program and service information protocol (PSIP), DVB-service information (SI), a service signaling channel, the broadcast service, etc.

In general, a broadcast receiver receives broadcast signals in real time and processes the received broadcast signals, and thus a delay may occur in broadcast signal processing. The delay needs to be avoided. However, in the IP-based digital broadcast system, broadcast data needs to be processed according to a protocol corresponding to each layer and transmitted/received. Thus, signaling data included in a particular layer may be used by the receiver when the signaling data is parsed up to the corresponding layer.

Meanwhile, a user of the receiver frequently changes a broadcast service, a broadcast channel, etc. and thus the receiver needs to be able to promptly change channels. In this process, the receiver needs to acquire signaling data included in a particular layer in order to search for a broadcast service, a broadcast channel, etc. selected by the viewer. In order to acquire the signaling data included in the particular layer, the receiver needs to process data of lower layers up to the corresponding layer. Therefore, there is a problem of processing data of several layers each time the viewer makes a selection.

DISCLOSURE

Technical Problem

An object of the present invention devised to solve the problem lies in a method and apparatus for processing signaling data suitable for an IP-based digital broadcast system.

Further, another object of the present invention is to provide a signaling data configuration enabling a receiver to promptly respond to a request from a viewer in the IP-based digital broadcast system.

Technical Solution

The object of the present invention can be achieved by providing a method of processing signaling data included in at least one protocol layer in an Internet protocol (IP)-based digital broadcast transmitter, including copying signaling data included in a packet of a layer (N+M) according to a protocol of the layer (N+M), generating the packet of the layer (N+M) by inserting the copied signaling data, a length field for identifying a length of the copied signaling data, and a signaling indicator for indicating that the copied signaling data is present into an end of a payload of the packet of the layer (N+M), generating a packet of a layer (N+L) including a header of the layer (N+L) and the packet of the layer (N+M) according to a protocol of the layer (N+L), generating a packet of a layer (N) including a header of the layer (N) and the packet of the layer (N+L) according to a protocol of the layer (N), the header of the layer (N) including an indicator field for identifying that the signaling indicator is included in the packet of the layer (N), and generating a broadcast signal by processing the packet of the layer (N) according to a protocol of a physical layer.

Preferably, the generating of the packet of the layer (N) includes verifying whether the signaling indicator is valid.

Preferably, the at least one protocol layer corresponds to at least one of seven layers of an open systems interconnection (OSI) reference model.

Preferably, a value of L is an integer smaller than a value of M.

Preferably, a value of N corresponds to 2, a value of M corresponds to 3, and a value of L corresponds to 1 and/or 2.

Preferably, the layer (N+L) corresponds to an IP layer when the value of L corresponds to 1, and the layer (N+L)

corresponds to a user datagram protocol (UDP) or a transmission control protocol (TCP) when the value of L corresponds to 2.

In another aspect of the present invention, provided herein is an IP-based digital broadcast receiver for processing signaling data included in at least one protocol layer, including an upper layer signaling detector for acquiring a packet of a layer (N) according to a protocol of a layer (N+M) by receiving a broadcast signal and processing the broadcast signal according to a protocol of a physical layer, parsing a header of the layer (N) in the acquired packet of the layer (N) to parse an indicator field, included in the header of the layer (N), for identifying that a signaling indicator is included in the packet of the layer (N), parsing the signaling indicator included in an end of the packet of the layer (N) when the indicator field indicates that the signaling indicator is present in the packet of the layer (N), the signaling indicator indicating that copied signaling data is present, parsing a length field for identifying a length of the copied signaling data positioned adjacent to the signaling indicator in the packet of the layer (N), and acquiring data corresponding to the length of the copied signaling data indicated by the length field from a start point of the length field in the packet of the layer (N) to recognize the acquired data as signaling data, wherein the signaling data is included in a packet of the layer (N+M) according to the protocol of the layer (N+M).

Preferably, the IP-based digital broadcast receiver further includes a parser for acquiring a packet of a layer (N+L) including a header of the layer (N+L) and the packet of the layer (N+M) according to a protocol of the layer (N+L) by processing the packet of the layer (N).

Preferably, the upper layer signaling detector verifies whether the signaling indicator is valid before parsing the length field for identifying the length of the copied signaling data.

Preferably, the at least one protocol layer corresponds to at least one of seven layers of an OSI reference model.

Preferably, a value of L is an integer smaller than a value of M.

Preferably, a value of N corresponds to 2, a value of M corresponds to 3, and a value of L corresponds to 1 and/or 2, wherein the layer (N+L) corresponds to an IP layer when the value of L corresponds to 1, and the layer (N+L) corresponds to UDP or TCP when the value of L corresponds to 2.

In another aspect of the present invention, provided herein is a method of processing signaling data included in at least one protocol layer in an IP-based digital broadcast transmitter, including measuring an offset value from a start of a packet of a layer (N+M) according to a protocol of the layer (N+M) to a point at which signaling data included in the packet of the layer (N+M) starts, generating the packet of the layer (N+M) by inserting the measured offset value, a length field for identifying a length of copied signaling data, and a signaling indicator indicating that the copied signaling data is present into an end of a payload of the packet of the layer (N+M), generating a packet of a layer (N+L) including a header of the layer (N+L) and the packet of the layer (N+M) according to a protocol of the layer (N+L), generating a packet of a layer (N) including a header of the layer (N) and the packet of the layer (N+L) according to a protocol of the layer (N), the header of the layer (N) including an indicator field for identifying that the signaling indicator is included in the packet of the layer (N), and generating a broadcast signal by processing the packet of the layer (N) according to a protocol of a physical layer.

Preferably, the generating of the packet of the layer (N) includes verifying whether the signaling indicator is valid.

Preferably, the at least one protocol layer corresponds to at least one of seven layers of an OSI reference model.

Preferably, a value of L is an integer smaller than a value of M.

Preferably, a value of N corresponds to 2, a value of M corresponds to 3, and a value of L corresponds to 1 and/or 2.

wherein the layer (N+L) corresponds to an IP layer when the value of L corresponds to 1, and the layer (N+L) corresponds to UDP or TCP when the value of L corresponds to 2.

Advantageous Effects

The present invention is effective in transmitting signaling data through a payload of a broadcast packet in a digital broadcast system using IP.

According to the present invention, even when signaling data unsuitable for an existing format needs to be transmitted, it is possible to transmit the signaling data without separately correcting a protocol.

According to the present invention, transmission efficiently may be improved by not separately configuring a protocol of a packet format, etc. for less frequently transmitted signaling data.

According to the present invention, even when a new upper layer protocol is applied in the future, signaling data may be directly transmitted through an IP layer without a separate integration process.

BEST MODE

Hereinafter, although the preferred embodiments of the present invention will be described in detail with reference to the accompanying drawings and descriptions of the drawings, the present invention is not restricted or limited by the embodiments.

Although the terms used in the following description are selected, as much as possible, from general terms that are widely used at present while taking into consideration the functions obtained in accordance with the present invention, these terms may be replaced by other terms based on intentions of those skilled in the art, customs, emergence of new technologies, or the like. In addition, in a particular case, terms that are arbitrarily selected by the applicant of the present invention may be used. In this case, the meanings of these terms will be described in corresponding description parts of the invention. Accordingly, it should be noted that the terms used herein should be construed based on practical meanings thereof and the whole content of this specification, rather than being simply construed based on names of the terms.

Figure 1:
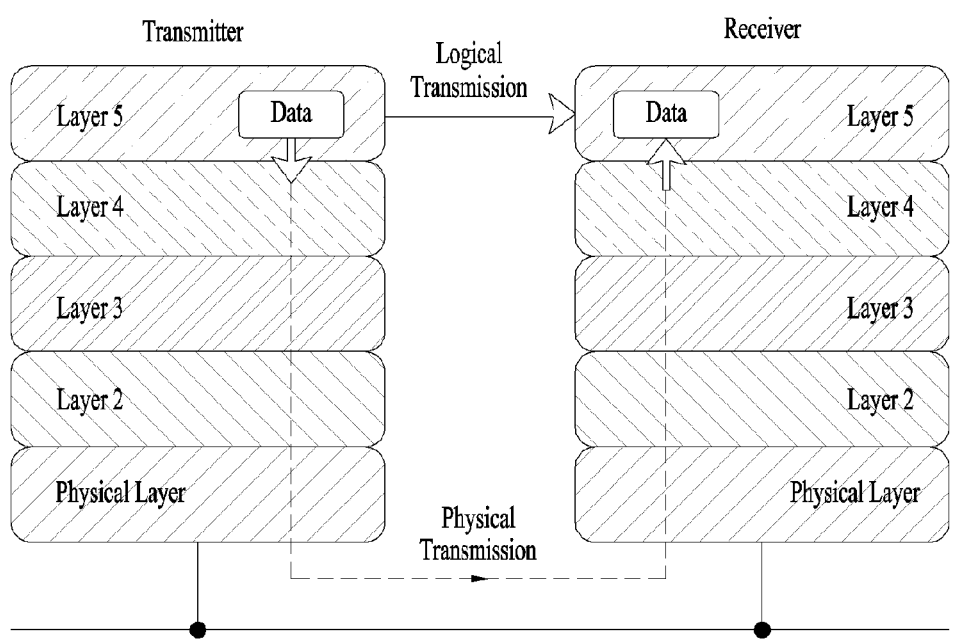
FIG. 1 is a diagram illustrating a hierarchical structure of a protocol of a transmitting/receiving end based on an IP recognized by the present invention.

FIG. 1 illustrates a hierarchical structure of a protocol of a transmitting/receiving end based on an IP recognized by the present invention.

For convenience of description, FIG. 1 expresses layers up to layer 5 as upper layers of seven OSI layers. When a transmitter has data to be transmitted in layer 5, the data is processed using a protocol corresponding to a physical layer in layer 4 of the transmitter and is transmitted to a receiver. The receiver performs opposite processing to that of the transmitter. In the receiver, data is processed using a protocol corresponding to layer 4 in a physical layer and is transmitted using a protocol corresponding to layer 5.

Even though data is transmitted through the above-described procedure from a physical point of view, data received by the receiver may be considered to be transmitted from layer 5 of the transmitting end to layer 5 of the receiving end from a logical point of view.

In an IP-based digital broadcast system, each layer may be defined by at least one of the following protocols.

A physical layer may correspond to a physical layer of DVB-NGH, a physical layer of ATSC-MH, a physical layer of ATSC 3.0, etc.

Layer 2 may correspond to DVB-generic stream encapsulation (GSE), Type-Length-Value (TLV), a link layer of ATSC 3.0, unidirectional lightweight encapsulation (ULE), etc.

Layer 3 may correspond to IP.

Layer 4 may correspond to user datagram protocol (UDP), transmission control protocol (TCP), etc.

Layer 5 or an upper layer thereof may correspond to MPEG media transport (MMT), dynamic adaptive streaming over HTTP (MPEG-DASH), file delivery over unidirectional transport (FLUTE), etc.

Figure 2:
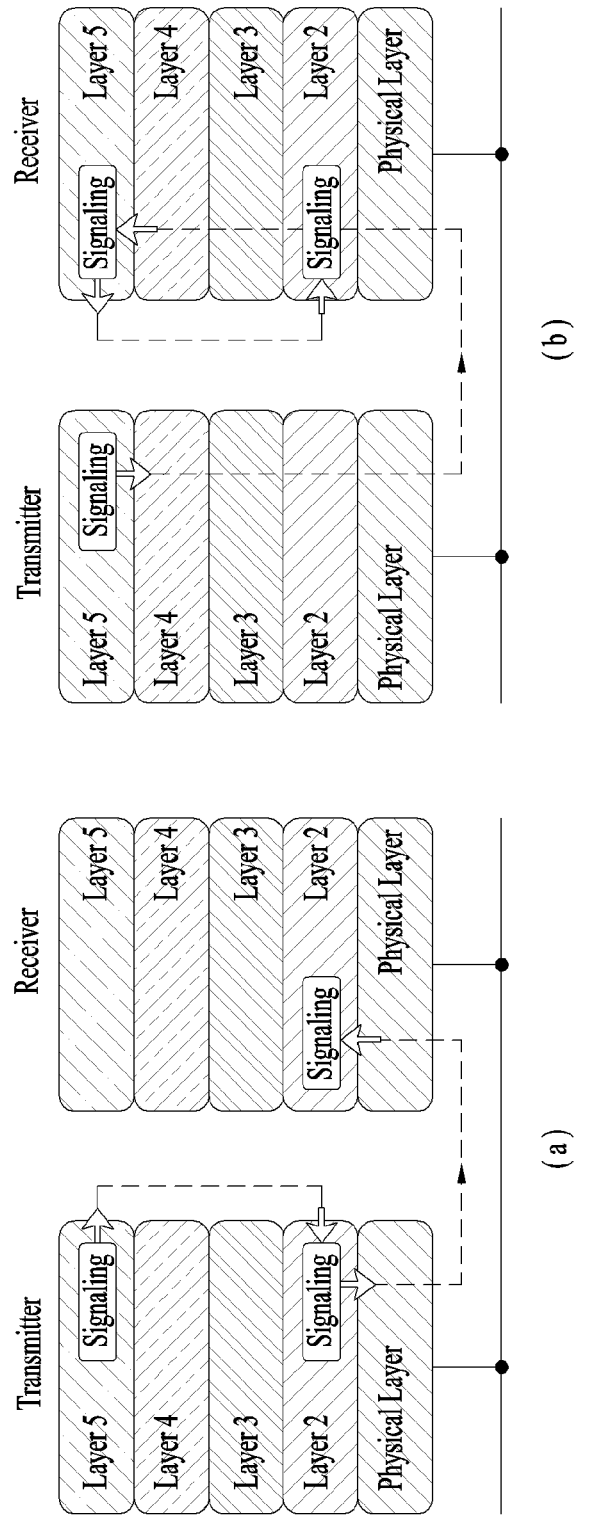
FIG. 2 is a diagram illustrating a process of delivering signaling data (or signaling information) in the hierarchical structure of the protocol of the transmitting/receiving end based on IP recognized by the present invention.

FIG. 2 illustrates a process of delivering signaling data (or signaling information) in the hierarchical structure of the protocol of the transmitting/receiving end based on IP recognized by the present invention.

In the receiving end (or receiver) of the IP-based digital broadcast system, signaling data such as configuration information of a program (information that describes a broadcast program) is mainly processed in layer 2. To this end, in an upper layer, the signaling information is transmitted by designating a separate packet type using a format suitable for corresponding signaling or by using a scheme of extending a layer 2 (L2) header, etc. Information about the packet type or the signaling format is delivered to a lower layer using a scheme supported by each layer and is finally delivered to the receiver through the physical layer.

In a protocol stack including layers, a header and a payload of an upper layer are processed as one protocol data unit (PDU) on a side of the transmitting end (transmitter), and thus a lower layer performs a process thereof without being involved with information about the payload of the upper layer. Therefore, when header information cannot be easily corrected in layers 3 and 4 such as IP and UDP, it is impossible to include information related to signaling in the header.

Referring to FIG. 2(a), when the transmitter transmits signaling information necessary for a lower layer of the receiver in the above-described protocol stack, the transmitter needs to include the signaling information necessary for the lower layer in advance and transmit the signaling information. In this instance, an upper layer may deliver information to the lower layer using a control message, etc. controlled by a processor of the system.

In other words, in the structure of FIG. 2(a), to allow the receiver to use signaling information (or signaling data) of layer 5 in layer 2, the transmitter needs to process broadcast data such that the signaling information of layer 5 is included in layer 2 and transmit the broadcast data to the receiver.

Referring to FIG. 2(b), signaling information (or signaling data) may be transmitted through a payload without going through the above-described procedure of FIG. 2(a). In the receiver, even when the payload is information necessary for a lower layer, the lower layer is not aware of this fact. After processing of an upper layer is terminated, the information is delivered inside the system. In other words, the signaling information cannot be processed in the protocol, and it is possible to deliver information that allows acquisition of the signaling information using the control message, etc. controlled by the processor of the system of the receiver.

In other words, in the structure of FIG. 2(b), the transmitter includes signaling information in layer 5 and processes broadcast data, and the receiver performs decoding from a physical layer to layer 5 and may acquire signaling information of layer 2 with reference to signaling information included in layer 5.

Figure 3:
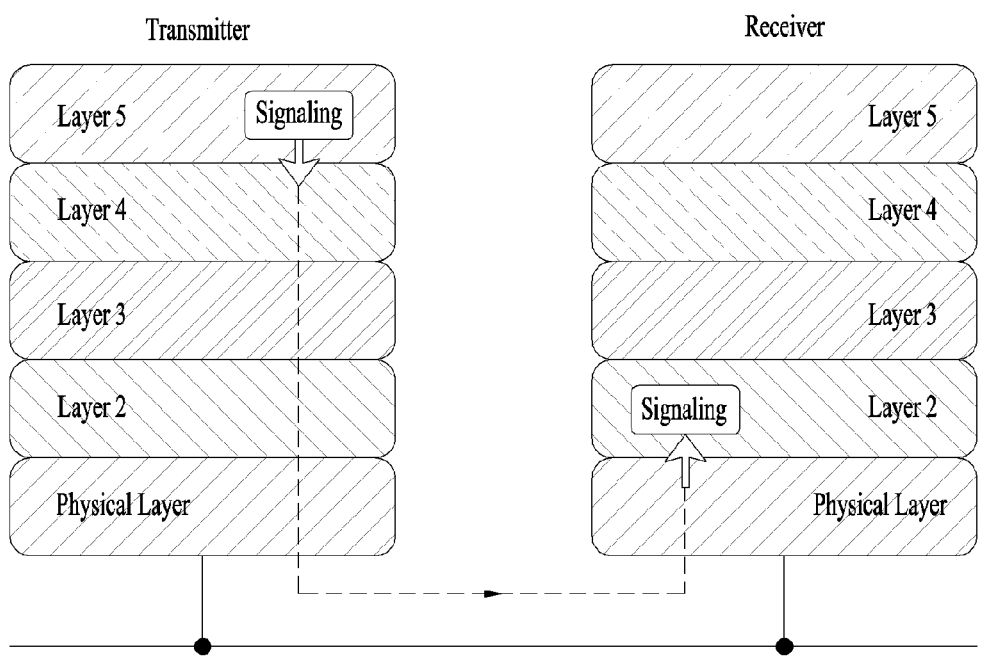
FIG. 3 is a diagram illustrating delivery of signaling information in a protocol hierarchical structure according to an embodiment of the present invention.

FIG. 3 illustrates delivery of signaling information in a protocol hierarchical structure according to an embodiment of the present invention.

In the present invention, signaling information may be referred to as signaling data, or signaling data may be referred to as signaling information.

The present invention proposes a signaling method that supports rapid access to data by a receiver in an IP-based digital broadcast system.

For example, the present invention proposes a method of allowing rapid access by the receiver by delivering signaling information configured in layer 5 to layer 2. In addition, the present invention proposes a method of directly delivering signaling information to layer 2 through a payload without using a packet for separate signaling when only a portion of a packet of layer 5 is signaling information necessary for layer 2.

The present invention proposes a method of enabling the receiver to identify signaling information in layer 2 even when information generated in layer 5 is delivered to layer 2 through layer 4 or layer 3 in which information cannot be added to a header.

Delivery of information between layers described above or to be described below is not restricted to the layers mentioned above. For example, the method and apparatus proposed in the present invention may be applied to a case in which signaling information included in layer 2, layer 3, layer 4, layer 5, layer 6 or layer 7 needs to be used in a lower layer thereof (a physical layer, layer 2, layer 3, layer 4, layer 5 or layer 6) when an OSI-7 hierarchical structure is applied. The present invention may be used such that signaling information included in an upper layer processed in a transmitting end is used in a lower layer of a receiving end.

A scheme proposed in the present invention is given below.

In a first scheme proposed in the present invention, signaling data to be transmitted from layer 5 is copied, the signaling data is added to a particular portion of a payload and transmitted, and the receiver extracts the signaling data.

In a second scheme proposed in the present invention, an offset value based on a portion of a packet is obtained with respect to signaling data to be transmitted from layer 5, the offset value is added to a particular portion of a packet and transmitted to a payload, and the receiver extracts the offset value.

When the signaling data is transmitted using the above-mentioned scheme, all signaling may be processed in band. The above-mentioned scheme solves a problem of transmitting additional signaling information out of band to connect signaling data between layers in an existing protocol layer.

Figure 4:
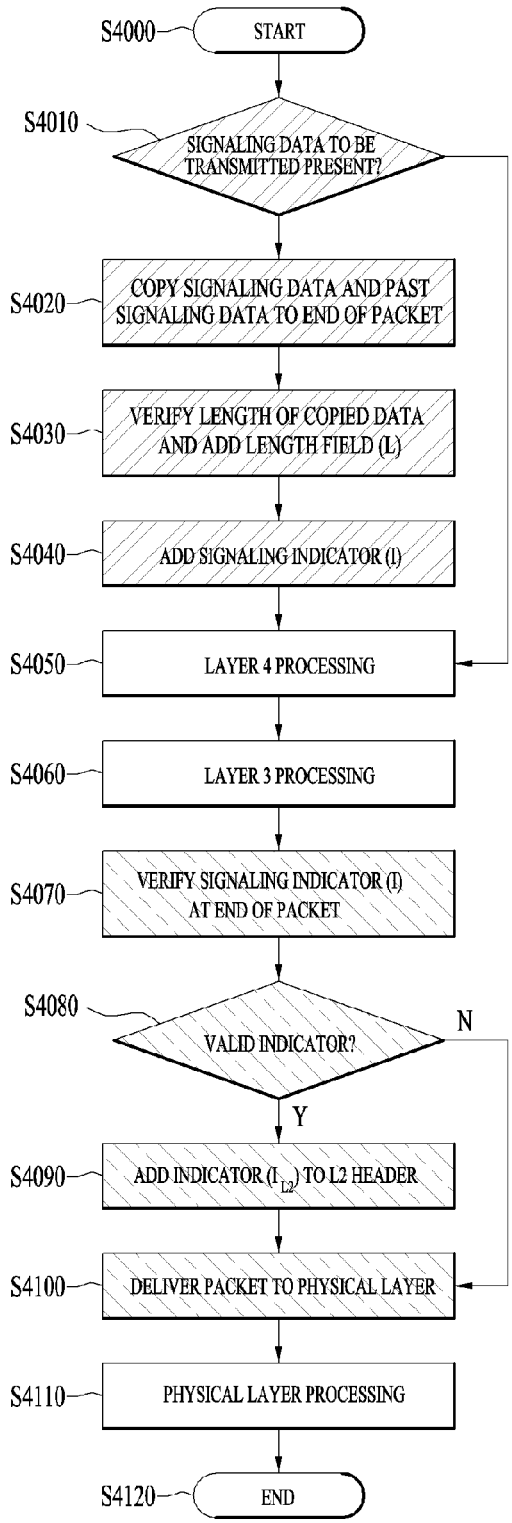
FIGS. 4(a) and 4(b) are flowcharts illustrating operations of a transmitter and a receiver in a process of delivering signaling data in a protocol layer according to a first scheme of the present invention.
Figure 4:
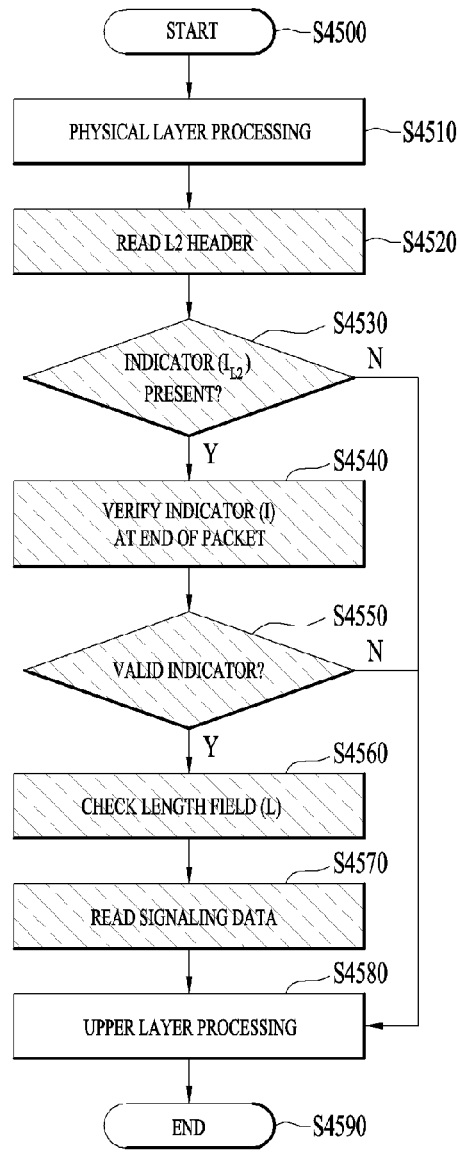

FIG. 4 illustrates operations of the transmitter and the receiver in a process of delivering signaling data in a protocol layer according to the first scheme of the present invention.

A description will be given of the first scheme of the present invention, in which signaling data to be transmitted from layer 5 is copied in the transmitter, the signaling data is added to a particular portion of a payload and transmitted, and the receiver extracts the signaling data, with reference to FIG. 4.

Referring to FIG. 4(*a*), the transmitter operates as below.

In S4010, the transmitter determines whether signaling data to be transmitted from layer 5 is present.

When the signaling data to be transmitted is present, the transmitter copies the data to an end of a packet in S4020

The transmitter verifies a length of the copied data, and indicates a value thereof by a length field (L). In S4030, the transmitter adds the value L to the end of the packet. In this instance, the value L may be in bits or bytes, which needs to be determined in advance.

In S4040, the transmitter adds a signaling indicator (I) which indicates that the signaling data to be transmitted is present to the end of the packet. Therefore, in the present embodiment, a final payload of layer 5 may include an original payload, the copied signaling data, the length field (L), and/or the signaling indicator (I). In this case, a payload may be generated in the above-described order. Constant bits or bytes may be allocated to the length field (L) and the signaling indicator (I) at all times. In this case, positions of the length field (L) and the signaling indicator (I) may be identified by the transmitter/receiver in layer 5 and layer 2. In addition, a value of the signaling indicator (I) may be configured as a bit string known to the transmitter/receiver.

In S4050, the transmitter adds a layer 4 header (L4 header) to the packet, or processes data according to a protocol of layer 4.

In S4060, the transmitter adds a layer 3 header (L3 header) to the packet, or processes data according to a protocol of layer 3.

In S4070, when a PDU is delivered from an upper layer in a protocol processing procedure of layer 2, the transmitter verifies the signaling indicator (I) by checking an end of the PDU.

In S4080, the transmitter determines whether the verified signaling indicator (I) is appropriate. When the verified signaling indicator (I) is appropriate, the transmitter configures an indicator field (IL2) that indicates a layer 2 packet (L2 packet) including the signaling data in a particular portion of a layer 2 header (L2 header) in S4090.

Meanwhile, when the transmitter determines that the signaling indicator (I) is inappropriate or determines that the signaling indicator (I) is absent in S4080, the transmitter presumes that the packet does not include the signaling data.

In S4100, the transmitter delivers the signaling data (or packet) processed through all or some of the above-described processes to a physical layer.

The transmitter processes the signaling data (or packet) according to a protocol of the physical layer.

Referring to FIG. 4(*b*), the receiver operates as below.

In S4510, the receiver processes the signaling data according to the protocol of the physical layer.

In S4520, when the packet is delivered from the physical layer to layer 2, the receiver reads a layer 2 header (L2 header).

In S4530, the receiver checks information about the L2 header to verify whether the packet includes the indicator field (IL2).

In a case of the packet of layer 2 including the indicator field (IL2), the receiver may check a last portion of the packet at which the signaling indicator (I) is positioned to verify whether the portion is a bit string corresponding to the signaling indicator (I) in S4540. When the receiver determines that the L2 packet has no error using a scheme such as cyclic redundancy check (CRC), etc., the receiver may omit a procedure of verifying the bit string.

In S4550, the receiver verifies whether the signaling indicator (I) is valid.

When the receiver verifies that the signaling indicator (I) is present, the receiver may check a value of the length field (L) at a particular position of the packet to obtain a length of the signaling data in S4560.

When the length of the signaling data is obtained, the receiver may read data positioned immediately in front of the length field (L) as much as the length field (L) to extract the copied signaling data in S4570.

The receiver processes a packet and/or signaling data according to a general protocol suitable for a corresponding layer for layer 3 and up.

Figure 5:
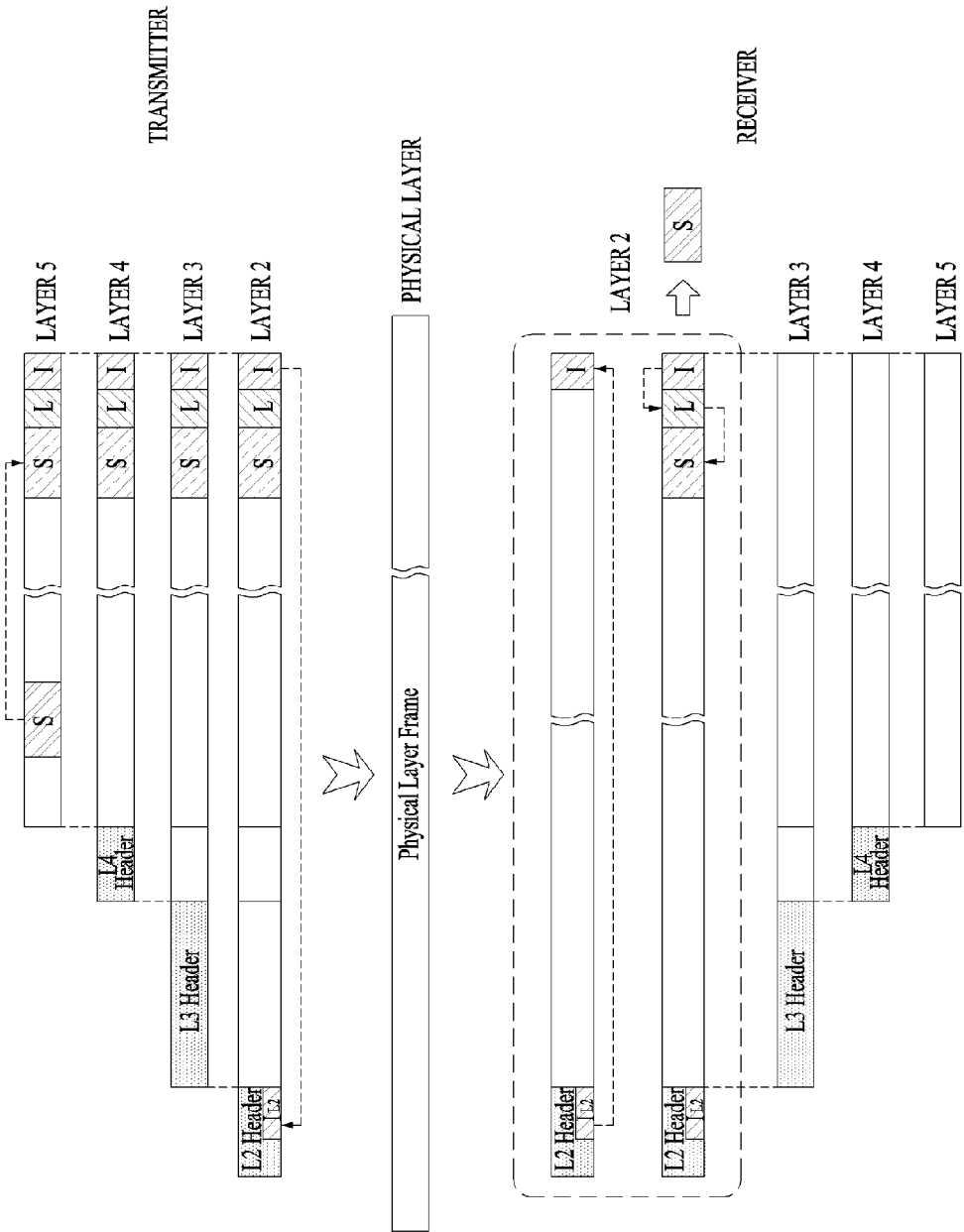
FIG. 5 is a diagram illustrating processing of a packet (or data packet) in the process of delivering signaling data in the protocol layer according to the first scheme of the present invention.

FIG. 5 illustrates processing of a packet (or data packet) in the process of delivering signaling data in the protocol layer according to the first scheme of the present invention.

The transmitter copies signaling data included in a data packet of layer 5, adds the copied signaling data to a last portion of a payload of the data packet, and inserts a length field (L) and/or a signaling indicator (I).

The transmitter processes the data packet by inserting a layer 4 header according to a protocol of layer 4.

The transmitter processes the data packet by inserting a layer 3 header according to a protocol of layer 3.

The transmitter processes the data packet by adding an indicator field (IL2) to a layer 2 header according to a protocol of layer 2 with reference to the signaling indicator (I) included in the data packet.

The transmitter processes the data packet according to a protocol of a physical layer and transmits the data packet to the receiver.

Meanwhile, the receiver decodes, parses, or processes the data packet according to a protocol of a physical layer.

The receiver parses a layer 2 header according to a protocol of layer 2, and verifies the presence of the signaling indicator (I) using the indicator field (IL2). In this instance, the indicator field (IL2) may correspond to information for verifying only whether the signaling indicator (I) is present. In this case, a protocol may be determined such that the signaling indicator (I) is included in a last portion of the data packet at all times. Alternatively, the indicator field (IL2) may include information for verifying the presence/absence of the signaling indicator (I) and identifying a position at which the signaling indicator (I) is located in the data packet. In this case, the receiver acquires the signaling indicator (I) using the indicator field (IL2).

The receiver checks the signaling indicator (I), and parses data (in bits or bytes) immediately beside the signaling indicator (I). In this instance, the data immediately beside the signaling indicator (I) may correspond to the length field (L). The receiver may recognize data having a length indicated by the length field (L) as signaling data at a position at which the length field (L) ends (or starts), and acquire the data.

Thereafter, the receiver processes the data packet according to a protocol of layer 3, layer 4, layer 5 or an upper layer thereof. In this process, the receiver may selectively process a data packet of an upper layer using signaling data acquired in layer 2. For example, a position of data desired by the receiver or a position of a service/program desired by the receiver may be located in the signaling data to selectively process data of the corresponding position.

In this way, the receiver may acquire signaling data present in a packet of layer 5 in advance only through processing in layer 2 before processing in layer 5.

Figure 6:
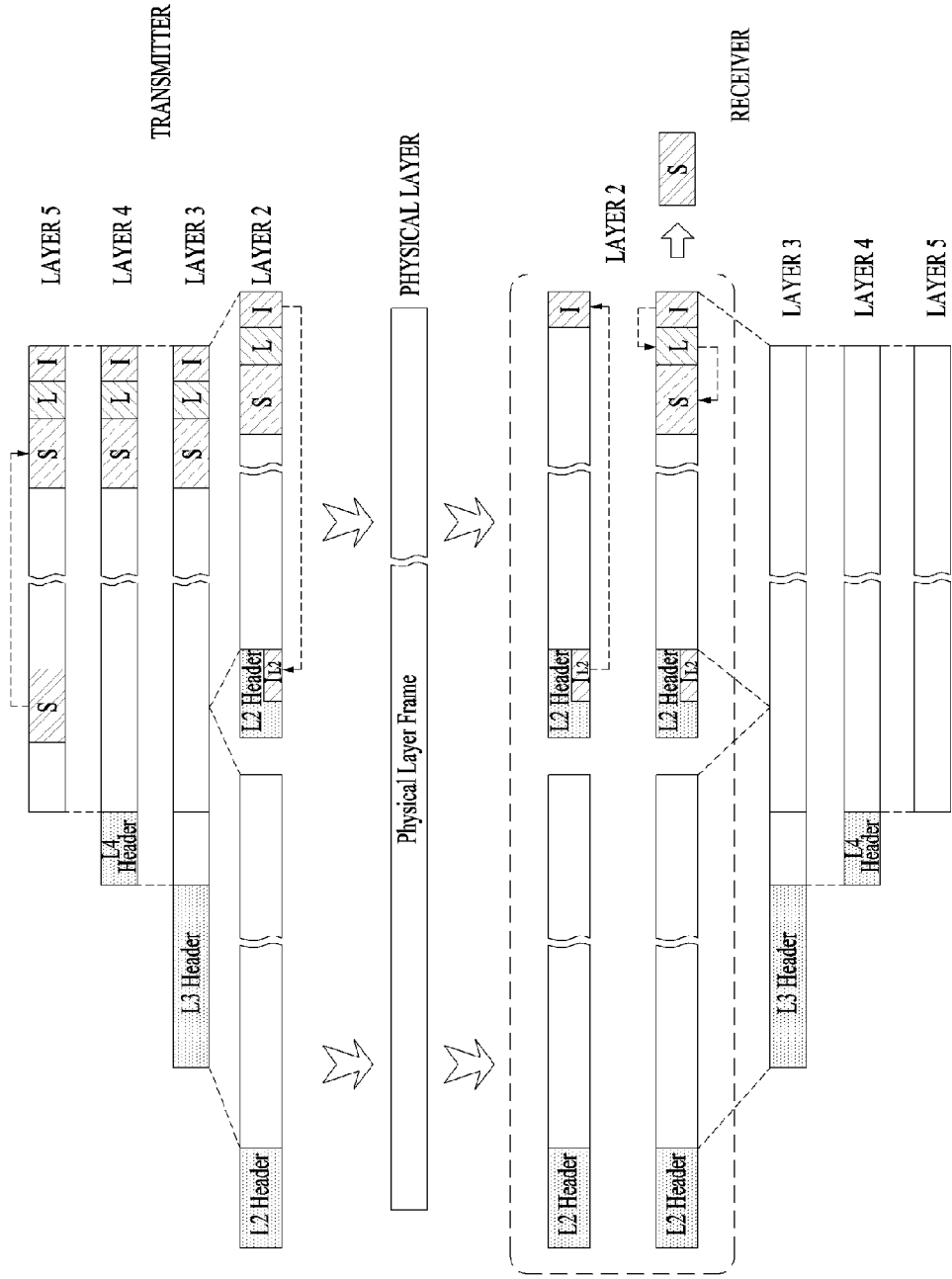
FIG. 6 is a diagram illustrating another example of processing of a packet (or data packet) in the process of delivering signaling data in the protocol layer according to the first scheme of the present invention.

FIG. 6 illustrates another example of processing of a packet (or data packet) in the process of delivering signaling data in the protocol layer according to the first scheme of the present invention.

Processing of a data packet illustrated in FIG. 6 will be described on the assumption of the description of processing of the data packet illustrated in FIG. 4 or FIG. 5. The processing of the data packet illustrated in FIG. 6 corresponds to a configuration of the data packet processed in the transmitter and/or the receiver to transmit signaling data when fragmentation of a data packet of layer 2 such as DVB-GSE is supported in the processing of the data packet described with reference to FIG. 5.

In processing of the data packet in the transmitter, a description of layer 5, layer 4, layer 3 and/or a physical layer will be replaced by the description with reference to FIG. 5.

Referring to FIG. 6, when fragmentation is supported in layer 2, the transmitter may add the indicator field (IL2) only to a last fragment or add the indicator field (IL2) to all fragments. In this case, the indicator field (IL2) needs to be added to a fragment including the signaling indicator (I) at all times.

In processing of the data packet in the receiver, a description of layer 5, layer 4, layer 3 and/or a physical layer will be replaced by the description with reference to FIG. 5.

When the transmitter adds the indicator field (IL2) to all fragments of layer 2, the receiver may parse the indicator field (IL2) in a header of each fragment to verify that the signaling indicator (I) is present in a last portion of a last fragment of layer 2. The receiver acquires the signaling indicator (I) from the last fragment, and parses the length field (L) adjacent to data of the signaling indicator (I). The receiver may recognize data having a length indicated by the length field (L) as signaling data at a position at which the length field (L) ends (or starts), and acquire the data. In this instance, when the length of the signaling data indicated by the length field (L) is longer than a length of a payload included in the last fragment of layer 2, the receiver may recognize that signaling data having a remaining length is included in a payload which is included in a fragment previous to the last fragment of layer 2.

When the transmitter adds the indicator field (IL2) to the last fragment of layer 2, the receiver may parse the indicator field (IL2) in a header of the last fragment to verify that the signaling indicator (I) is present in the last portion of the last fragment of layer 2. The receiver acquires the signaling indicator (I) from the last fragment, and parses the length field (L) adjacent to data of the signaling indicator (I). The receiver may recognize data having a length indicated by the length field (L) as signaling data at a position at which the length field (L) ends (or starts), and acquire the data. In this instance, when the length of the signaling data indicated by the length field (L) is longer than a length of a payload belonging to the last fragment of layer 2, the receiver may recognize that signaling data having a remaining length is included in a payload which is included in a fragment previous to the last fragment of layer 2.

Figure 7:
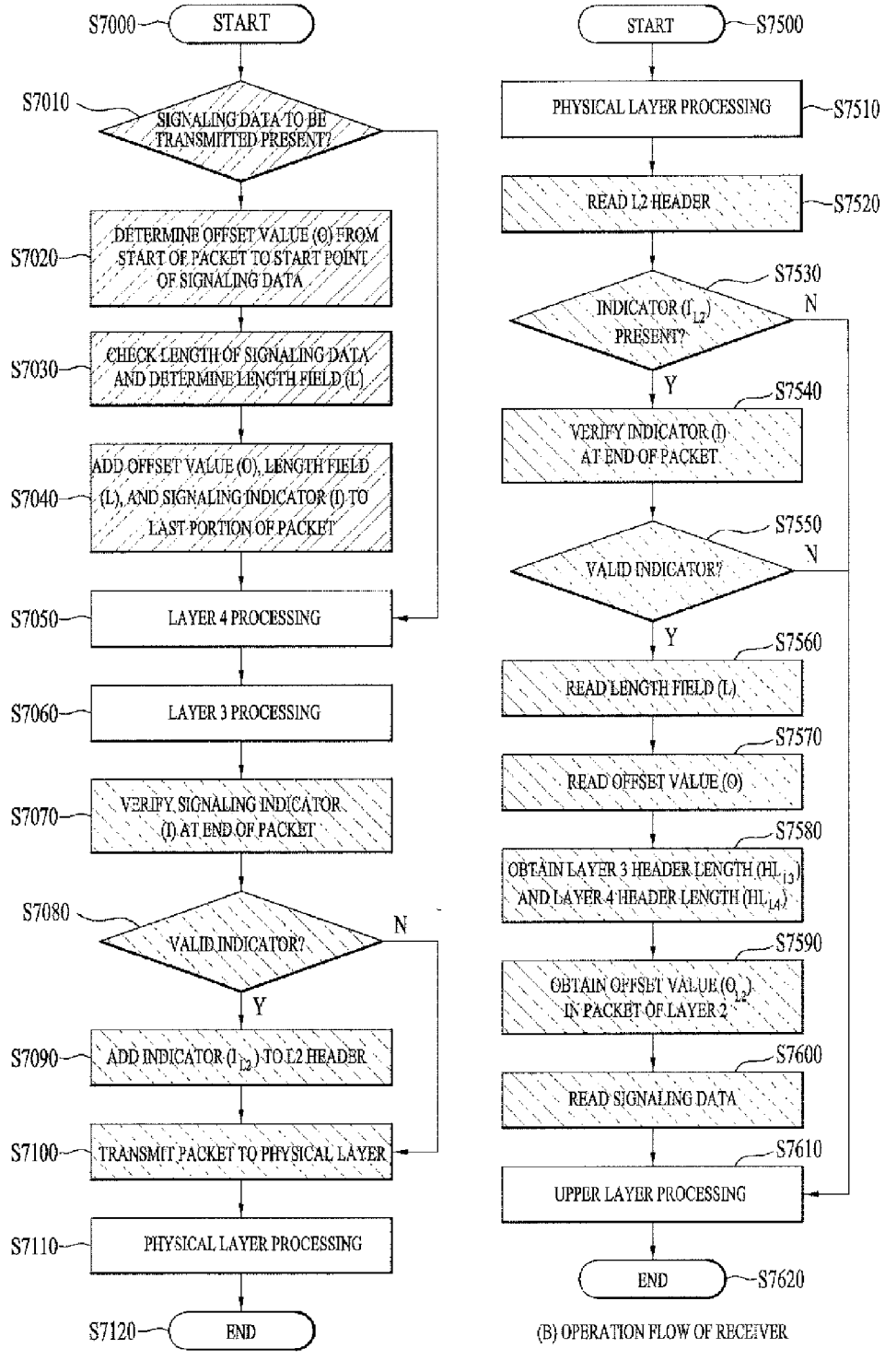
FIGS. 7(a) and 7(b) are flowcharts illustrating operations of the transmitter and the receiver in a process of delivering signaling data in a protocol layer according to a second scheme of the present invention.

FIG. 7 illustrates operations of the transmitter and the receiver in a process of delivering signaling data in a protocol layer according to the second scheme of the present invention.

Delivery of signaling data in the protocol layer according to the second scheme of the present invention is a scheme in which an offset value of signaling data to be transmitted from layer 5 is added to a particular portion of a packet (or data packet) and transmitted, and the receiver extracts the offset value.

The above-described offset value may be indicated by a length from a start of a data packet of layer 5 (or a start of a payload of the data packet of layer 5) to a portion at which the signaling data starts.

Referring to FIG. 7(*a*), the transmitter determines whether signaling data to be transmitted from layer 5 is present in S7010.

When the signaling data to be transmitted is present, the transmitter obtains a length from a start of the packet of layer 5 or a start of the payload to a portion at which the signaling data starts, and determines the length to be an offset value (O) in S7020.

In S7030, the transmitter obtains a length of the signaling data to be transmitted, and indicates a value of the length by a length field (L). In this instance, the length field (L) may be in bits or bytes, which may be determined in advance.

In S7040, the transmitter adds the offset value (O) and the length field (L) to the last portion of the packet of layer 5, and adds a signaling indicator (I) indicating that the signaling data to be transmitted is present to the last portion of the packet. In this case, a final payload (or packet) of layer 5 may include data in order of an original payload, the offset value (O), the length field (L), and the signaling indicator (I). The offset value (O), the length field (L), and/or the signaling indicator (I) may have a constant number of bits allocated thereto at all times, and may be determined in advance by a protocol for layer 5 and/or layer 2. In addition, a value of the signaling indicator (I) may be configured as a bit string known to the transmitter/receiver.

In S7050, the transmitter may add a layer 4 header (L4 header) to the packet, or process data according to a protocol of layer 4.

In S7060, the transmitter may add a layer 3 header (L3 header) to the packet, or process data according to a protocol of layer 3.

In S7070, when a PDU is delivered from an upper layer in a protocol processing procedure of layer 2, the transmitter verifies the signaling indicator (I) by checking an end of the PDU.

In S7080, the transmitter determines whether the verified signaling indicator (I) is appropriate. When the verified signaling indicator (I) is appropriate, the transmitter adds an indicator field (IL2) indicating a layer 2 packet including signaling data to a particular portion of a layer 2 header (L2 header) in S7090. When the signaling indicator (I) is determined to be inappropriate or the signaling indicator (I) is determined to be absent, the transmitter presumes that the packet does not include the signaling data.

In S7100, the transmitter delivers the processed packet to a physical layer.

In S7110, the transmitter processes the packet according to a protocol of the physical layer and transmits the processed packet to the receiver.

Referring to FIG. 7(b), the receiver according to the second scheme of the present invention operates as below.

In S7510, the receiver decodes, parses, or processes the received packet according to a protocol of a physical layer.

In S7520, when the packet delivered from the physical layer is delivered to layer 2, the receiver reads an L2 header.

In S7530, the receiver verifies whether the packet includes an indicator field (IL2) in the L2 header.

When the packet includes the indicator field (IL2), the receiver may check a last portion of the packet at which the signaling indicator (I) is positioned to verify whether the portion is a bit string corresponding to the signaling indicator (I) in S7540. When the receiver determines that the L2 packet has no error using a scheme such as CRC, etc., the receiver may omit a procedure of verifying the bit string.

In S7550, the receiver verifies whether the signaling indicator (I) is valid.

When the signaling indicator (I) is valid, the receiver may check the length field (L) at a particular position of the packet to obtain a length of the signaling data in S7560.

In S7570, the receiver reads the offset value (O) immediately adjacent to the length field (L).

In S7580, the receiver obtains or calculates a layer 3 header length (HLL3) and/or a layer 4 header length (HLL4). A specific scheme of obtaining or calculating the layer 3 header length (HLL3) and/or the layer 4 header length (HLL4) will be described below.

In S7590, the receiver calculates an offset (OL2) with respect to a position of the signaling data in layer 2. The offset (OL2) with respect to the position of the signaling data in layer 2 may be calculated as a sum of the layer 3 header length (HLL3), the layer 4 header length (HLL4), and the offset value (O) (OL2=HLL3+HLL4+O).

In S7610, the receiver may extract the signaling data using the length field (L) and the offset (OL2) with respect to the position of the signaling data in layer 2.

In S7610, the receiver processes a packet according to a general protocol of a corresponding layer for upper layers equal to or above layer 3.

Figure 8:
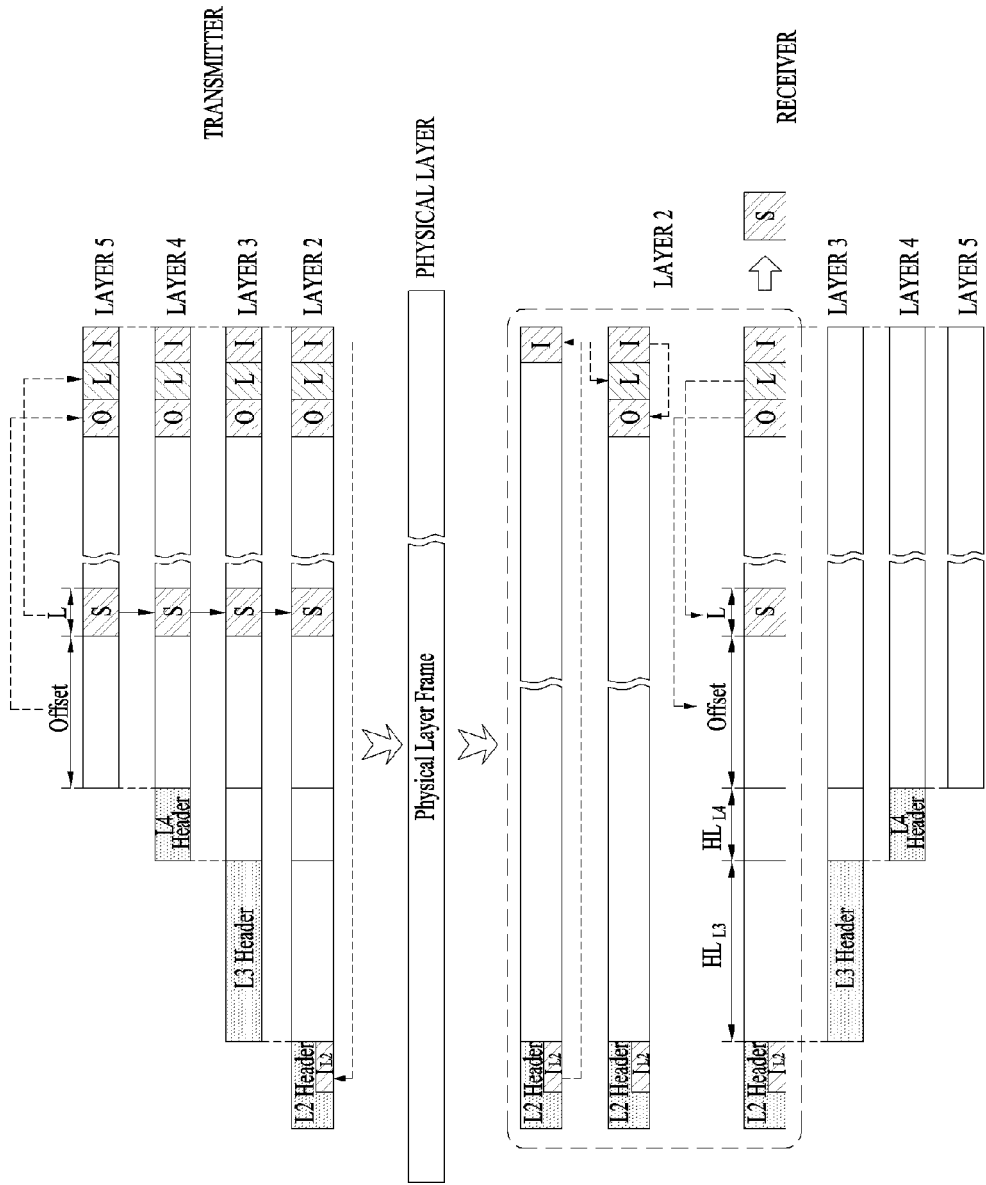
FIG. 8 is a diagram illustrating processing of a packet (or data packet) for delivery of signaling data in the protocol layer according to the second scheme of the present invention.

FIG. 8 illustrates processing of a packet (or data packet) for delivery of signaling data in the protocol layer according to the second scheme of the present invention.

The transmitter configures a length from a start of a packet of layer 5 or a start of a payload in the packet of layer 5 to a position at which the signaling data starts as an offset value (O), and inserts this information into a last portion of the packet of layer 5. The transmitter inserts a length field (L) indicating a length of the signaling data subsequent to the offset value (O). The transmitter inserts a signaling indicator (I) indicating that the signaling data is included subsequent to the length field (L).

The transmitter processes the data packet by inserting a layer 4 header according to a protocol of layer 4.

The transmitter processes the data packet by inserting a layer 3 header according to a protocol of layer 3.

The transmitter processes the data packet by adding an indicator field (IL2) to a layer 2 header according to a protocol of layer 2 with reference to the signaling indicator (I) included in the data packet.

The transmitter processes the data packet according to a protocol of a physical layer and transmits the data packet to the receiver.

Meanwhile, the receiver decodes, parses, or processes the data packet according to a protocol of a physical layer.

The receiver parses a layer 2 header according to a protocol of layer 2, and verifies the presence of the signaling indicator (I) using the indicator field (IL2). In this instance, the indicator field (IL2) may correspond to information for only verifying whether the signaling indicator (I) is present. In this case, a protocol may be determined such that the signaling indicator (I) is included in a last portion of the data packet at all times. Alternatively, the indicator field (IL2) may include information for verifying the presence/absence of the signaling indicator (I) and identifying a position at which the signaling indicator (I) is located in the data packet. In this case, the receiver acquires the signaling indicator (I) using the indicator field (IL2).

The receiver checks the signaling indicator (I), and parses data (in bits or bytes) immediately beside the signaling indicator (I). In this instance, the data immediately beside the signaling indicator (I) may correspond to the length field (L). The receiver parses the offset value (O) corresponding to data immediately beside the length field (L). The receiver acquires signaling data which is located with an offset corresponding to a length obtained by adding a layer 3 header length (HLL3), a layer 4 header length (HLL4), and an offset value (O) at a start of a payload of a packet of layer 2. A value obtained by adding the layer 3 header length (HLL3), the layer 4 header length (HLL4), and the offset value (O) may be defined as an offset value (OL2) of signaling data in the packet of layer 2.

Thereafter, the receiver processes the data packet according to a protocol of layer 3, layer 4, layer 5 or an upper layer thereof. In this process, the receiver may selectively process a data packet of an upper layer using signaling data acquired in layer 2. For example, a position of data desired by the receiver or a position of a service/program desired by the receiver may be located in the signaling data to selectively process data of the corresponding position.

In this way, the receiver may acquire signaling data present in the packet of layer 5 in advance only through processing in layer 2 before processing in layer 5.

Figure 9:
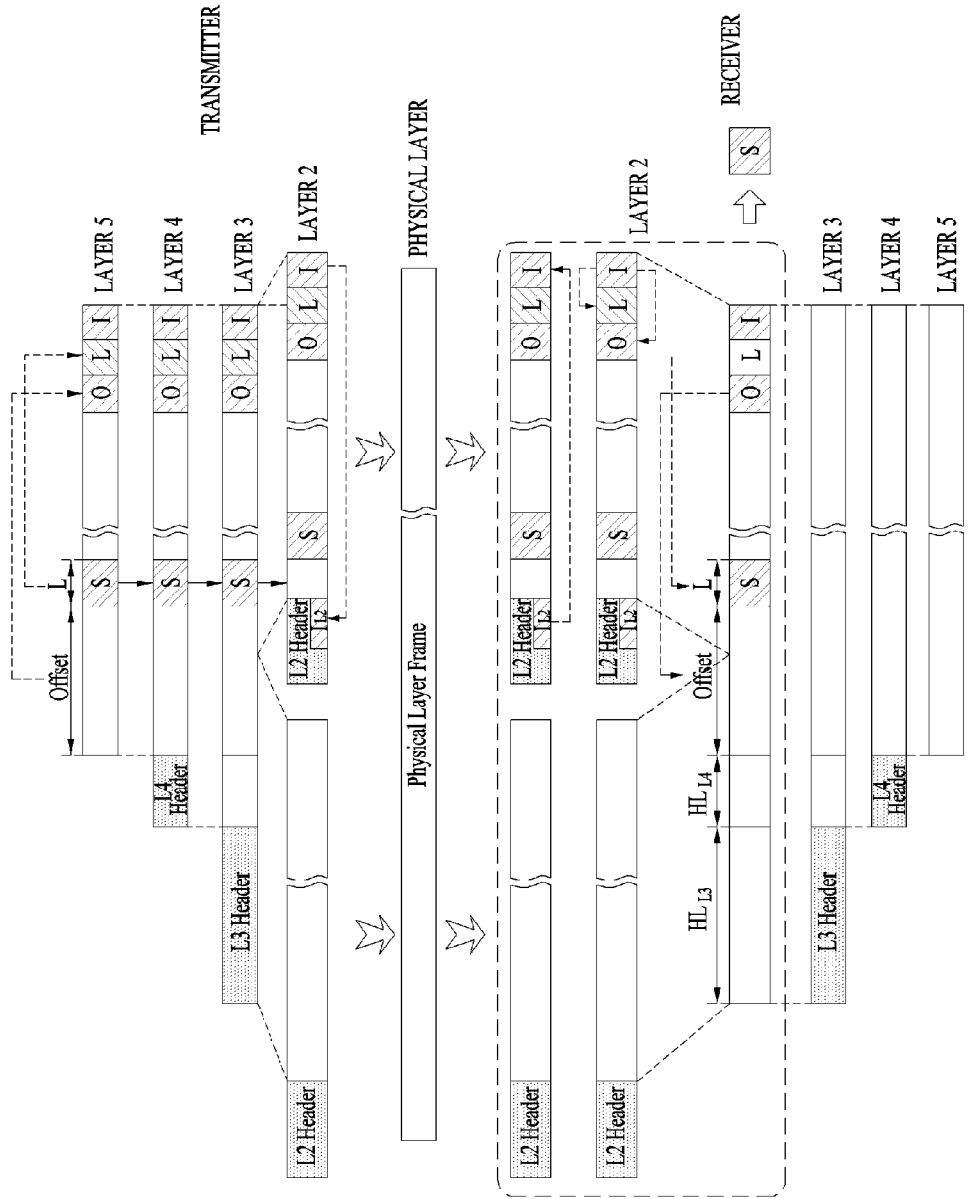
FIG. 9 is a diagram illustrating another example of processing of a packet (or data packet) in the process of delivering signaling data in the protocol layer according to the second scheme of the present invention.

FIG. 9 illustrates another example of processing of a packet (or data packet) in the process of delivering signaling data in the protocol layer according to the second scheme of the present invention.

Processing of a data packet illustrated in FIG. 9 will be described on the assumption of the description of processing of the data packet illustrated in FIG. 7 or FIG. 8. The processing of the data packet illustrated in FIG. 9 corresponds to a configuration of the data packet processed in the transmitter and/or the receiver to transmit signaling data when fragmentation of a data packet of layer 2 such as DVB-GSE is supported in the processing of the data packet described with reference to FIG. 8.

In processing of the data packet in the transmitter, a description of layer 5, layer 4, layer 3 and/or a physical layer will be replaced by the description with reference to FIG. 8.

Referring to FIG. 9, when fragmentation is supported in layer 2, the transmitter may add the indicator field (IL2) only to a last fragment or add the indicator field (IL2) to all fragments. In this case, the indicator field (IL2) needs to be added to a fragment including the signaling indicator (I) at all times.

In processing of the data packet in the receiver, a description of layer 5, layer 4, layer 3 and/or a physical layer will be replaced by the description with reference to FIG. 8.

When the transmitter adds the indicator field (IL2) to all fragments of layer 2, the receiver may parse the indicator field (IL2) in a header of each fragment to verify that the signaling indicator (I) is present in a last portion of a last fragment of layer 2. The receiver acquires the signaling indicator (I) from the last fragment, and parses the length field (L) adjacent to data of the signaling indicator (I). The receiver parses an offset value (O) adjacent to the length field (L). The receiver may acquire signaling data having a size of the length field (L) which starts using a length obtained by adding a layer 3 header length (HLL3), a layer 4 header length (HLL4), and the offset value (O) as an offset from a start of a payload of layer 2.

In this instance, when the length of the signaling data indicated by the length field (L) is longer than a length of a payload belonging to a particular fragment of layer 2, the receiver may recognize that signaling data having a remaining length is included in a payload which is included in a fragment subsequent to the particular fragment of layer 2.

When the transmitter adds the indicator field (IL2) to the last fragment of layer 2, the receiver may parse the indicator field (IL2) in a header of the last fragment to verify that the signaling indicator (I) is present in the last portion of the last fragment of layer 2. The receiver acquires the signaling indicator (I) from the last fragment, and parses the length field (L) adjacent to data of the signaling indicator (I). The receiver parses the offset value (O) adjacent to the length field (L). The receiver may acquire signaling data having a size of the length field (L) which starts using the length obtained by adding the layer 3 header length (HLL3), the layer 4 header length (HLL4), and the offset value (O) as an offset from a start of the payload of layer 2.

Figure 10:
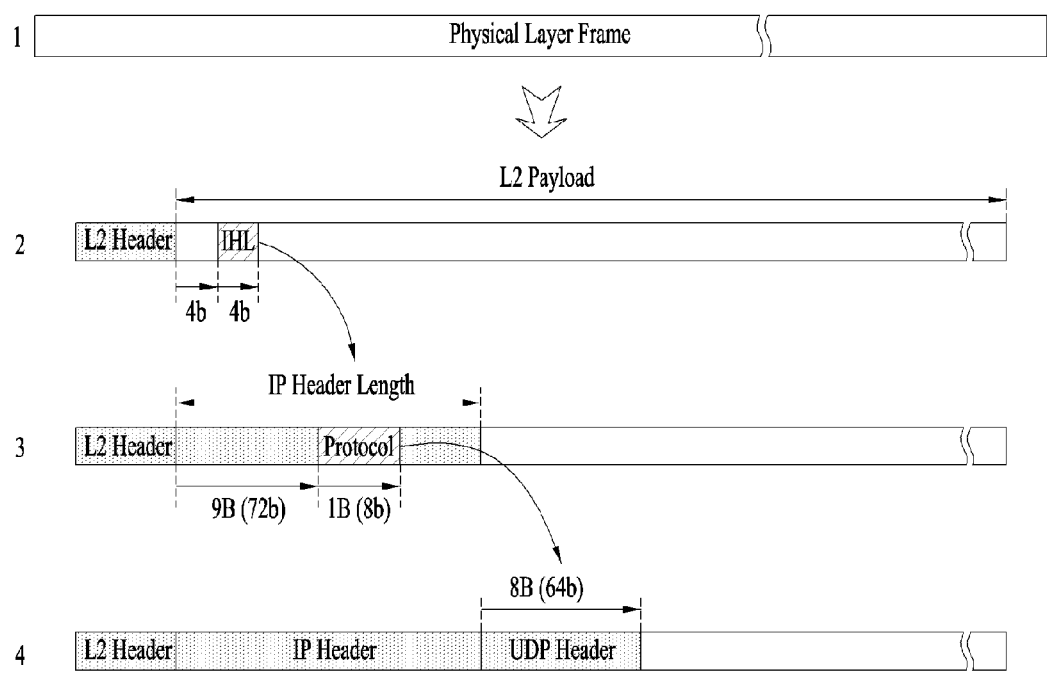
FIG. 10 is a diagram illustrating a process of finding a length of a header for each upper layer equal to or above layer 2 in processing of a packet (or data packet) for delivery of signaling data in the protocol layer according to the second scheme of the present invention.

FIG. 10 illustrates a process of finding a length of a header for each upper layer equal to or above layer 2 in processing of a packet (or data packet) for delivery of signaling data in the protocol layer according to the second scheme of the present invention.

In general, the receiver may be aware of a protocol used by layer 3 in layer 2. For example, IP is used as the protocol of layer 3 in the IP-based digital broadcast system, and UDP or TCP is used as a protocol of layer 4 in an IP-based system.

An IP header excluding options has a length of 20 bytes, and a TCP header excluding options also has a length of 20 bytes. UDP includes a header which has a fixed length of 8 bytes.

When a header length of IP, TCP, etc. is not 20 bytes due to addition of an option, the header length may be obtained as below.

For example, FIG. 10 illustrates a process of finding a header length of an upper layer in layer 2 by the receiver when a protocol of layer 3 is IP and a protocol of layer 4 is UDP. A description of the present example is given on the assumption that the receiver is only aware of a protocol type (for example, IP) of layer 3 in layer 2.

The present process may be simplified when an additional signaling process is applied or the receiver has more information about an upper protocol in layer 2 due to a scheme such as exchange of internal system information.

When a packet is delivered from a physical layer to layer 2, the receiver may distinguish between a header part and a payload part of a layer 2 packet (L2 packet) in layer 2. In this instance, a field indicating that a protocol of an upper layer is IP is present in an L2 packet header. Therefore, the receiver prepares to deliver the payload part to the IP layer.

Data corresponding to a particular length (for example, 4 bits) from a portion at which particular bits (for example, 4 bits) are shifted in a payload of layer 2 may have length information of an IP header. The receiver may be aware of a length of an IP packet by verifying this portion. The IP header excluding options may have a length of 20 bytes.

Data corresponding to a particular length (for example, 1 byte) from a portion at which particular bytes (for example, 9 bytes) are shifted in the payload of layer 2 may indicate protocol information of layer 4. For example, when data of the corresponding portion has a value of 0×11 (17 in base 10), this means that layer 4 corresponds to UDP.

A header length of UDP is fixed to 8 bytes, and thus the receiver refers to this value as a length of a layer 4 header. Even when the protocol of layer 4 is defined as another protocol rather than UDP, a header length of layer 4 can be obtained according to a rule defined in each protocol.

Figure 11:
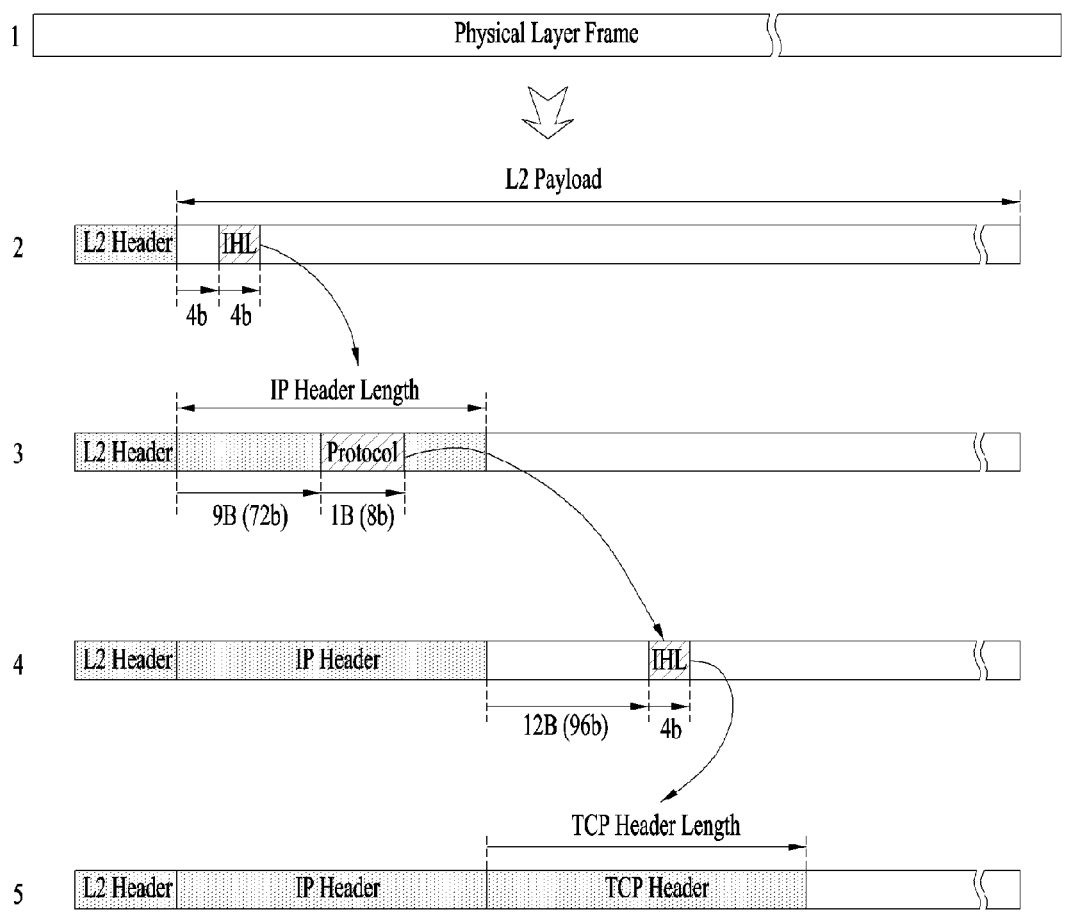
FIG. 11 is a diagram illustrating another process of finding a length of a header for each upper layer equal to or above layer 2 in processing of a packet (or data packet) for delivery of signaling data in the protocol layer according to the second scheme of the present invention.

FIG. 11 illustrates another process of finding a length of a header for each upper layer equal to or above layer 2 in processing of a packet (or data packet) for delivery of signaling data in the protocol layer according to the second scheme of the present invention.

FIG. 11 illustrates a process of finding a header length of an upper layer in layer 2 by the receiver when a protocol of layer 3 is IP and a protocol of layer 4 is TCP.

A description of the present example is given on the assumption that the receiver is only aware of a protocol type (for example, IP) of layer 3 in layer 2. The present process may be simplified when more information about an upper protocol is included in layer 2 due to a scheme such as exchange of internal information of the system or a signaling scheme.

When a packet is delivered from a physical layer to layer 2, the receiver may distinguish between a header part and a payload part of a layer 2 packet (L2 packet) in layer 2. In this instance, a field indicating that a protocol of an upper layer is IP is present in an L2 packet header. Therefore, the receiver prepares to deliver the payload part to the IP layer.

Data corresponding to a particular length (for example, 4 bits) from a portion at which particular bits (for example, 4 bits) are shifted in a payload of layer 2 may have length information of an IP header. The receiver may be aware of a length of an IP packet by verifying this portion. An IP header excluding options may have a length of 20 bytes.

Data corresponding to a particular length (for example, 1 byte) from a portion at which particular bytes (for example, 9 bytes) are shifted in the L2 payload indicates protocol information of layer 4. In this instance, when data of the corresponding portion has a value of 0×06 (6 in a decimal number), this means that layer 4 corresponds to TCP.

A length of the IP header is known, and thus a TCP header starts from a position at which a length of the IP header is shifted from the L2 payload. Data corresponding to a particular length (for example, 4 bits) from a portion at which a particular length (for example, 12 bytes) is shifted from a start point of the TCP header has length information of the TCP header. Thus, a header length of the TCP packet may be obtained by verifying this portion. A TCP header excluding options has a length of 20 bytes.

The receiver may refer to the verified length information of the TCP header as length information of an L4 header.

Figure 12:
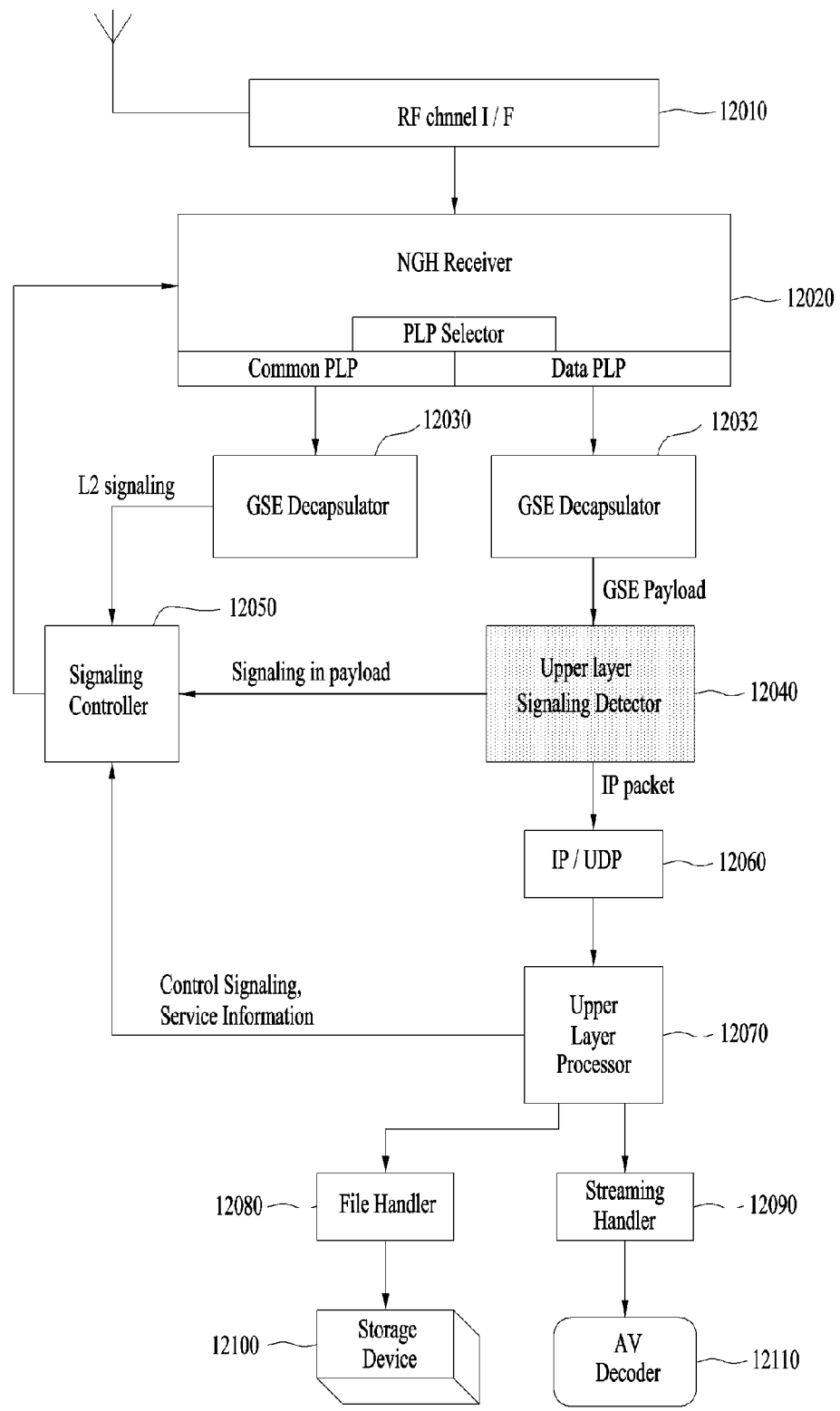
FIG. 12 is a block diagram illustrating the receiver that implements embodiments of the present invention.

FIG. 12 illustrates the receiver that implements the embodiments of the present invention.

The receiver according to the present embodiment may include a radio frequency channel interface (RF channel I/F) 12010, an NGH receiver 12020, GSE decapsulators 12030 and 12032, an upper layer signaling detector 12040, a signaling controller 12050, an IP/UDP parser 12060, an upper layer processor 12070, a file handler 12080, a streaming handler 12090, a storage device 12100, and/or an audio/video (AV) decoder 12110.

The RF channel I/F 12010 receives a digital broadcast signal processed by the transmitter.

The NGH receiver 12020 demultiplexes data included in the broadcast signal. The NGH receiver 12020 separates and outputs particular data from the broadcast signal irrespective of a name thereof. In this process, signaling information may be used. The signaling information may correspond to the signaling data acquired through the above-described processes. Alternatively, the NGH receiver 12020 may demultiplex data from the broadcast signal using a transmission parameter (for example, L1 or L2 signaling in DVB or a transmission parameter in ATSC). The NGH receiver 12020 may include a physical layer pipe (PLP) selector, and the PLP selector may distinguish between a common PLP and a data PLP. A PLP refers to a logical set including particular data in the broadcast signal.

The GSE decapsulators 12030 and 12032 decapsulate the common PLP and the data PLP, respectively.

The upper layer signaling detector 12040 extracts signaling data defined in an upper layer from a lower layer when signaling data is delivered between layers as described above. The upper layer signaling detector 12040 may perform an operation described in the detailed description of the invention.

The signaling controller 12050 controls signaling information of the transmission parameter, etc. and/or the upper layer signaling detector 12040, and delivers the signaling information to another part of the receiver.

The IP/UDP parser 12060 parses data according to a protocol of IP and/or UDP.

The upper layer processor 12070 processes a protocol of an upper layer of IP and/or UDP.

The file handler 12080 receives and processes a file object.

The streaming handler 12090 processes data for streaming.

The storage device 12100 stores a series of necessary data.

The AV decoder 12110 decodes AV data.

Hereinbefore, the present invention is effective in transmitting signaling data through a payload of a broadcast packet in a digital broadcast system using IP.

Further, according to the present invention, even when signaling data unsuitable for an existing format needs to be transmitted, it is possible to transmit the signaling data without separately correcting a protocol.

In addition, according to the present invention, when a method described in the present invention is used for signaling data which is not periodically transmitted and is less frequently transmitted, transmission efficiency may be improved by not separately configuring a protocol of a packet format, etc. for the less frequently transmitted signaling data.

Furthermore, according to the present invention, even when a new upper layer protocol is applied in the future, signaling data may be directly transmitted through an IP layer without a separate integration process.

Although the description of the present invention is explained with reference to each of the accompanying drawings for clarity, it is possible to design new embodiment(s) by merging the embodiments shown in the accompanying drawings with each other. In addition, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention are not limited to the configurations and methods of the embodiments mentioned in the foregoing description. The embodiments mentioned in the foregoing description can be configured in a manner of being selectively combined with one another entirely or in part to enable various modifications.

In addition, a method of processing data according to the present invention can be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tape, floppy disks, optical data storage devices, and the like for example and also include such a carrier-wave type implementation as a transmission over the Internet. Furthermore, as the processor-readable recording medium is distributed to a computer system connected via a network, processor-readable code can be saved and executed according to a distributive system.

It will be appreciated by those skilled in the art that various modifications and variations can be made in the present invention without departing from the spirit or scope of the invention. Thus, it is intended that the present invention cover the modifications and variations of this invention provided they come within the scope of the appended claims and their equivalents.

Both apparatus and method inventions are mentioned in this specification and descriptions of both of the apparatus and method inventions may be complementarily applicable to each other.

As described above, the mode for carrying out the present invention is described as a best mode for carrying out the present invention.

INDUSTRIAL APPLICABILITY

The present invention is applicable to a whole broadcasting industry.

The invention claimed is:

1. A method for processing signaling data in an Internet protocol (IP)-based digital broadcast transmitter, the method comprising:

copying upper layer signaling data included in an upper layer packet according to an upper layer protocol;

adding the copied upper layer signaling data at an end of the upper layer packet, wherein a length field for identifying a length of the copied upper layer signaling data, and a signaling indicator for indicating that the copied upper layer signaling data is present are further added to the end of the upper layer packet;

generating an IP layer packet including a header of the IP layer packet and the upper layer packet according to an IP layer protocol;

generating a link layer packet including a header of the link layer packet and the IP layer packet according to a link layer protocol, the header of the link layer packet including an indicator field for indicating that the signaling indicator is included in the link layer packet; and generating a broadcast signal by processing the link layer packet according to a physical layer protocol, wherein the copied upper layer signaling data is acquired through link layer processing by using the signaling indicator, the indicator field and the length field at a digital broadcast receiver before upper layer processing is performed.

2. The method according to claim 1, wherein the generating of the link layer packet includes verifying whether the signaling indicator is valid.

3. An Internet protocol (IP)-based digital broadcast receiver for processing signaling data, comprising an upper layer signaling detector configured to acquire a link layer packet by receiving a broadcast signal and processing the broadcast signal according to a protocol of a physical layer, parse a header of the acquired link layer packet to parse an indicator field, included in the header of the link layer packet, to identify that a signaling indicator is included in the link layer packet, parse the signaling indicator included in an end of the link layer packet when the indicator field indicates that the signaling indicator is present in the link layer packet, the signaling indicator indicating that copied upper layer signaling data is present, parse a length field for identifying a length of the copied upper layer signaling data positioned adjacent to the length field in the link layer packet, acquire data corresponding to the length of the copied upper layer signaling data indicated by the length field from a start point of the length field in the link layer packet, and extract the acquired as upper layer signaling data through link layer processing before upper layer processing is performed, wherein the upper layer signaling data is included in an upper layer packet according to an upper layer protocol.

4. The IP-based digital broadcast receiver according to claim 3, wherein the upper layer signaling detector verifies whether the signaling indicator is valid before parsing the length field for identifying the length of the copied upper layer signaling data.

5. A method for processing signaling data in an Internet protocol (IP)-based digital broadcast transmitter, comprising:

measuring an offset value from a start of an upper layer packet according to an upper layer protocol to a point at which upper layer signaling data is included in the upper layer packet;

adding the measured offset value, a length field for identifying a length of the upper layer signaling data, and a signaling indicator at an end of the upper layer packet, wherein the signaling indicator indicates that the upper layer signaling data is present;

generating an IP layer packet including a header of the IP layer packet and the upper layer packet according to an IP layer protocol;

generating a link layer packet including a header of the link layer packet and the IP layer packet according to a link layer protocol, the header of the link layer packet including an indicator field for indicating that the signaling indicator is included in the link layer packet; and generating a broadcast signal by processing the link layer packet according to a physical layer protocol, wherein the upper layer signaling data is acquired through link layer processing by using the measured offset value, the signaling indicator, the indicator field and the length field at a digital broadcast receiver before upper layer processing is performed.

6. The method according to claim 5, wherein the generating of the link layer packet includes verifying whether the signaling indicator is valid.

* * * * *